US006560601B1

(12) United States Patent
Björnerstedt

(10) Patent No.: US 6,560,601 B1
(45) Date of Patent: May 6, 2003

(54) DATABASE TRANSACTION WITH LOCKING IN TWO PHASES AND MULTIPLE VERSIONS OF OBJECTS

(75) Inventor: Dag Anders Björnerstedt, Mörbydalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 09/234,514

(22) Filed: Jan. 21, 1999

(30) Foreign Application Priority Data

Jan. 22, 1998 (SE) .............................................. 9800161

(51) Int. Cl.[7] .............................................. G06F 17/30
(52) U.S. Cl. ................ 707/8; 707/1; 707/200; 707/201; 707/203
(58) Field of Search ................. 707/8–10, 201, 707/203, 1, 200, 202, 100, 103; 714/12, 1

(56) References Cited

U.S. PATENT DOCUMENTS

| | | | |
|---|---|---|---|
| 4,627,019 A | | 12/1986 | Ng |
| 5,170,480 A | | 12/1992 | Mohan et al. |
| 5,261,069 A | | 11/1993 | Wilkinson et al. |
| 5,280,612 A | * | 1/1994 | Lorie et al. |
| 5,893,117 A | * | 4/1999 | Wang .................... 707/203 |
| 6,026,401 A | * | 2/2000 | Brealey et al. |

FOREIGN PATENT DOCUMENTS

EP   0471282 A2   2/1992

OTHER PUBLICATIONS

*Transaction Processing: Concepts and Techniques* Jim Gray, Morgan Kaufmann Publishers, Inc. (1993) ISBN 1–55860–190–Z, Cover page plus pp. 380–381.

* cited by examiner

Primary Examiner—Kim Vu
Assistant Examiner—Joon Hwan Hwang

(57) ABSTRACT

A method is provided for consistent reading of a number of objects (1O, 2O, 3O) within a database. The method is adapted for use with a database in which transactions are managed by two-phase locking. A first phase (A) includes a request for access to objects (1O, 2O, 3O) affected by the transaction and locking of these objects as soon as access thereto has been granted. A second phase (B) includes committing the transaction and releasing all locks that were set in the first phase. The actual work performed in a transaction may be summarized as object changing actions and/or object non-changing actions. A change, or an update, of the content of an object is performed by writing the new content into a new version of the object, where the current version of the object prior to the transaction is retained until no further transactions make use of this version. The transaction performs all changing actions within the first phase (A). The transaction is adapted to retain access to the objects (1O, 2O, 3O) after the second phase (B). The transaction is also adapted to perform the largest possible number of non-changing actions in a third phase (C), after the second phase (B), whereafter the transaction closes access to the objects. Thus, the transaction is provided with a consistent snapshot of effected objects (1O, 2O, 3O) in the database after the locks have been released, with regard to non-changing actions.

21 Claims, 2 Drawing Sheets

DATABASE TRANSACTION WITH LOCKING IN TWO PHASES AND MULTIPLE VERSIONS OF OBJECTS

FIELD OF INVENTION

The present invention relates to a method of enabling a plurality of data objects to be read consistently in a database.

The invention can be applied to particular benefit in databases where transactions are managed with the aid of two-phase locking, wherein a first phase comprises a request for access to objects affected by the transaction and locking of these objects as soon as access has been obtained, and wherein a second phase comprises commitment of the transaction and the release of all locks that were set in the first phase.

DESCRIPTION OF THE BACKGROUND ART

Transaction management is a fundamental technique in database management processes and is sometimes used to isolate a transaction from other actions or events in the database and to provide a consistent picture of the information contained in a dynamic and changing database.

In the case of a traditional transaction process, those objects used by the transaction during the actual transaction process are blocked so as to prevent their use by other transactions during an ongoing transaction. Other transactions that desire access to the same objects must therefore either wait or abort and try again later on.

The actual work carried out in a transaction includes actions that change an object and/or actions that leave an object unchanged, these actions, or events, being referred to hereinafter as object changing events and object non-changing events. The content of an object can be changed, or updated, by writing the changed content into a new version of the object, or by writing over the old version.

In known techniques, all actions concerning a transaction, both a changing and a non-changing transaction, are carried out prior to "commitment" of the transaction. The term "commit/commitment" of a transaction is well known to the person skilled in this art, and means in simple terms that the transaction informs that the actions or events requested by the transaction and requiring isolation have been carried out. It can also be mentioned that the term commit also typically includes the release of all locks that have been set, although we speak about the release of locks as a separate action in the present document.

The current or existing version of the object prior to the transaction is retained in this current form until no further transactions use that current or existing version any longer. This means that different versions of an object may need to be saved for periods of different duration, depending on which transactions use the versions in question.

Certain applications require access to a database in real time, in a manner which will not block access to objects used with other transactions, particularly with regard to purely reading transactions. It is known in this context to use a database management system that permits access to different objects that are not transaction-bound and that, on the contrary, are fast and non-blocking.

The drawback with such systems is that the user acting in the database cannot proceed in the same isolated manner as that which is possible in a transaction-bound system and cannot be provided with a guaranteed consistent picture of the database.

It is also known that non-blocking transactions can be achieved by managing a well-defined transaction protocol. These transaction protocols, however, are not easily managed and their implementation is complex, process-demanding and/or require a large memory capacity.

Thus, it is known either to provide a database that can be implemented quickly and simply but which will not always be able to guarantee a consistent picture of the database, in other words correct result, or to provide a database that while being management positive and showing a correct picture is both slow and ponderous in use.

Databases that are based on so-called optimistical control of concurrent transactions where no locks are used are also known to the art. This control is based on allowing all transactions with the assumption that no conflict will occur.

More specifically, an optimistical control of concurrent transactions means that a check is made to ensure that no conflicts will occur in conjunction with a transaction prior to the transaction being "committed". If a conflict is found to exist, the transaction is aborted. Otherwise, commitment of the transaction is allowed. It should also be mentioned that two different locks are usual in so-called two-phase locking, or locking in two phases.

A first lock is a so-called shared lock which is set by purely reading transactions with regard to a data object and which allows other reading transactions to have access to said object, but which locks the object to changing transactions.

A second lock is a so-called exclusive lock which is set by transactions that change the data object and which locks the object with regard to all other transactions.

The following publications disclose examples of earlier known techniques, in which different types of non-blocking transactions are exemplified.

U.S. Pat No. 4,627,019

This publication describes a database where an index covering the various objects it the database shows where the different objects are found. When an object-changing transaction is started, the transaction is referred to a new position in the database in which the changed objects shall be stored. A new index that points to the new positions of the changed objects is created.

The old index is retained and still points to the old positions of respective objects.

Each version of an earlier index is kept alive for as long as some transaction uses this version of the index.

Although this transaction management provides a non-blocking transaction protocol, it requires a large amount of memory space, since several different versions of the index can exist in parallel. Implementation of the transaction management is also relatively complex.

EP-A2-0 471 282

This publication describes the introduction of three new types of lock, to wit cash lock, pending lock and out-of-date lock. When a first transaction, a reading transaction, sets a lock on different objects, a cash lock is set instead of a shared lock. If a second transaction requests an exclusive lock on the same objects whilst the first transaction is still in process, the cash lock is changed to a pending lock.

If the second transaction changes an object with a pending lock, the lock is changed to an out-of-date lock. If the second transaction makes no change in an object, the pending lock is changed to a cash lock when the second transaction is committed.

The first transaction normally continues as long as all locks are cash locks. If any pending lock exists on any of the objects that are affected by the first transaction, the first transaction waits until the pending lock switches to some other lock.

The first transaction can continue when a pending lock changes to a cash lock. If the pending lock changes to an out-of-date lock, this indicates that the object has been changed and the first transaction is subsequently aborted.

Although this method enables a lock to be set that does not block changing transactions, it necessitates the abortion of a commenced reading transaction due to a data object changing transaction having changed an object whilst performing the reading transaction.

SUMMARY OF THE INVENTION

Technical Problems

When considering the earlier standpoint of techniques as described above, it will be seen that a technical problem resides in enabling transaction management in which the time period over which an allocated lock blocks an object changing transaction to be greatly shortened.

Another technical problem is one of shortening the time period between setting an allocated lock and releasing said lock for a non-changing transaction.

A further technical problem is one of providing unlimited access to objects used by a non-changing transaction with respect to time, without blocking objects affected by changing transactions during this access time, i.e. a non-blocking access after a lock set by the transaction has been released.

It will also be seen that a technical problem resides in dividing a transaction into changing and non-changing actions, in which an exclusive lock is provided for the changing actions in said transaction, and a non-blocking, unlimited in time, access to affected objects is provided for the non-changing actions.

Another technical problem is one of solving the afore-described technical problems in a database that is based on that each version of an object is allocated a counter which is incremented when a transaction is allowed access to the object, such as when setting a lock, and is decremented when a transaction no longer requires access to this version of the object, such as when releasing a lock.

A further technical problem is one of solving the earlier described technical problems in a database that is based on allocating to each transaction a time stamp which indicates the time at which the transaction was commenced, where each transaction stamps a version of respective affected objects with its time stamp when no younger transaction has time-stamped this version of the object, and where each version of an object shall be retained for as long as no transaction has been terminated as an older transaction, or is equally as old as the youngest time stamp that has been allocated to the version in question.

Solution

The present invention takes as its starting point a method of enabling a plurality of objects to be read consistently in a database in which transactions are managed by locking in two phases.

A first phase includes a request for access to the object affected by the transaction and for the objects to be locked after access has been obtained thereto, and a second phase which includes committing the transaction and the release of all locks set in the first phase.

The actual work performed in the transaction may include actions that change an object and/or actions that do not change an object, wherein updating or changing of the content of an object is effected by writing the changed content to a new version of the object, and wherein the version of the object that existed prior to the transaction is retained until no further transactions use the existing, or current, version.

The transaction performs all data changing actions in the first phase.

With a starting point from such a method and with the object of providing a solution to one or more of the aforesaid technical problems, it is proposed in accordance with tile present invention that the transaction retains access to said objects after the second phase, that the transaction performs the greatest possible number of non-changing actions after the second phase, and that the transaction closes access to the objects after performing said non-changing actions.

Subsequent to the release of said locks, the transaction thus retains consistent snapshots of affected objects within the database with respect to non-changing actions.

It is also proposed in accordance with the invention that after the second phase the access to an object will include marking respective objects in a current version as being used by the transaction, and that closing of access to the objects comprises removing said mark, therewith keeping the version of said object alive despite the transaction being committed, at least until the transaction is closed.

When each version of an object is allocated a counter which increments, steps up, when a transaction has been allocated access to said version, such as when setting a lock, and decremented, stepped down, when a transaction no longer needs access to said version, such as when releasing a lock, the present invention teaches that said mark consists in decrementation of the counter solely when the mark is removed, i.e. when closing the transaction.

When each transaction is allocated a time stamp that indicates the time at which the transaction was commenced, where each transaction stamps respective versions of affected objects with its time stamp when no younger transaction has time-stamped this version of the object, and where each version of an object is allowed to remain provided that no transaction which is older than or equally as old as the youngest time-stamp allocated to said version has still not been terminated, it is proposed in accordance with the invention that said mark comprises the time stamp of the version of respective objects, and that the transaction is considered to have been terminated when closing access to said object.

When the transaction solely includes non-changing actions, it is proposed in accordance with the invention that the lock will comprise a shared lock that will enable other transactions to obtain access to an object prior to the shared lock being released, but with the limitation of being able to only read the object.

With the intention of providing a so-called group opening, where all objects to be opened are known prior to commencement of the transaction, it is proposed in accordance with the present invention that the objects are opened in the first phase.

With the intention of providing so-called recursive opening of data objects, where one or more start objects is/are known prior to commencing the transaction, and where one or more of said start objects refers/refer to one or more further objects, it is proposed in accordance with the present invention that the start object(s) is/are opened in the first phase, that an evaluation of any references to further objects is made in the first phase, and that any further objects are opened in the first phase.

It is also proposed in accordance with the present invention that any references from any further objects to yet further objects are evaluated in the first phase, that any still further objects are opened in the first phase, and so on.

The present invention also enables the number of available objects to be limited, by predetermining the number of permitted levels of objects deriving from references to further objects from earlier opened objects.

With the intention of providing a so-called path opening, wherein one or more start objects is/are known prior to commencing the transaction, and wherein one or more of the start objects refers/refer to one or more further objects, it is proposed in accordance with the invention that the start object(s) is/are opened in the first phase, that any references to further objects are evaluated in the first phase with respect to a predetermined object of said start objects, and that any further objects are opened in the first phase.

According to one embodiment of the invention, any references from possible further objects to still further objects are evaluated in the first phase, and any still further objects are opened in the first phase, and so on.

According to another embodiment, the number of objects available is limited by allowing the number of permitted levels of objects deriving from references to further objects from earlier opened objects to be predetermined.

Advantages

Those advantages primarily afforded by an inventive method reside in a method which enables the time during which a transaction locks an object against access by other transactions to be shortened, therewith enabling reading transactions of a virtually non-blocking nature to be effected in a simple, fast, relatively memory-lean and calculation-beneficial manner.

The method provides a retained consistent snapshot of an object affected by a transaction after the transaction has been committed, therewith enabling the transaction to use the consistent picture of the object for non-changing actions without limiting the transaction with respect to time and without blocking other transactions.

The time period over which other transactions lock one or more objects, i.e. even transactions that are not purely reading transactions, can be shortened to different extents, meaning that a database will have different degrees of speeds for all transactions, since the waiting times for locked objects will be significantly shortened.

The present invention also provides a particularly advantageous method in databases where copying of different object versions is considered to be an expensive operation with respect to memory capacity, time and/or execution. According to one embodiment of the inventive method, copying is avoided primarily for reading transactions and permits earlier release of used locks with regard to time.

The present invention is also particularly advantageous in respect of databases where a need for consistent snapshots of a number of objects is found, but where this picture need not necessarily be fully updated in accordance with the latest transactions.

The invention is also particularly advantageous in respect of implementation within RAM databases where high requirements are found in connection with real time applications.

The primary characteristic features of an inventive method are set forth in the characterising clause of the following claim 1.

BRIEF DESCRIPTION OF THE DRAWINGS

The present invention will now be described in more detail with reference to an exemplifying method and also with reference to the accompanying drawings, in which.

DETAILED DESCRIPTION OF EMBODIMENTS AT PRESENT PREFERRED

Figure 1:
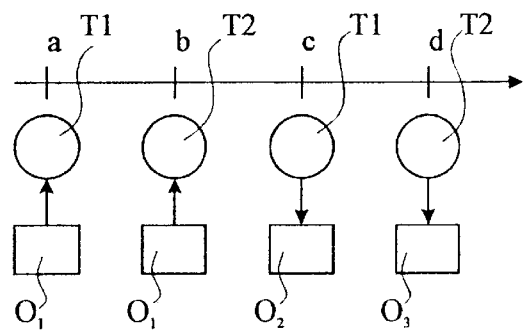
FIG. 1 illustrates schematically a first known problem concerning concurrent transactions in a database.

FIG. 1 thus illustrates a first case in a number of different known cases where transactions that are carried out concurrently within a database affect one another.

In this case, which can be referred to as lost updating, a first transaction T1 and a second transaction T2 update the same data object "O" at different times independently of one another and without being aware of each other.

At time point "a", the first transaction T1 collects a first version of the object $O_1$, and at time point "b", the second transaction T2 collects the same version $O_1$ of said object. When up-dating by the first transaction T1 is completed, tile updated object $O_2$ is written into the database over the first version of the object, at time point "c". When updating by the second transaction T2 is completed, the updated object $O_3$ is written into the database over the updating $O_2$ carried out by the first transaction T1, at time point "d".

When, for instance, the object is a document in which changes are made by two different users (T1, T2), the changes $O_2$ made by the first user T1 are lost in the updating $O_3$ from the second user T2.

The sequence of actions described above consists in "read, write, write", which can create a conflict.

This problem can be solved, for instance, by using traditional locking in two phases. The first transaction T1 then sets an exclusive lock on the object O, since tile transaction to be carried out is an updating transaction and therewith a changing transaction. The second transaction T2 will not then obtain access to the object O until the first transaction T1 has been committed and the exclusive lock released.

Figure 2:
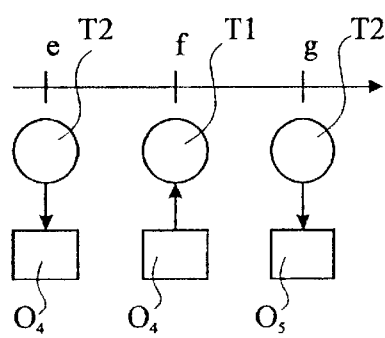
FIG. 2 illustrates schematically a second known problem concerning concurrent transactions in a database.

FIG. 2 illustrates another instance, referred to as dirty read, where a first transaction T1 is afforded access to an object $O_4$ and reads the object at time point "f" and where the object $O_4$ has been changed at an earlier time point "e" by a second transaction T2. The second transaction T2 changes the object $O_5$ one more time at a later time point "g". The readout performed by the first transaction T1 is called a dirty read, because the read object $O_4$ does not contain the final version of the $O_5$ content.

The sequence of actions carried out in this case consist in "write, read, write", which creates a conflict as shown.

This problem can also be resolved by the second transaction T2 setting an exclusive lock on the object $O_4$, since the transaction is a data changing transaction, therewith denying the reading transaction T1 access to said object.

Figure 3:
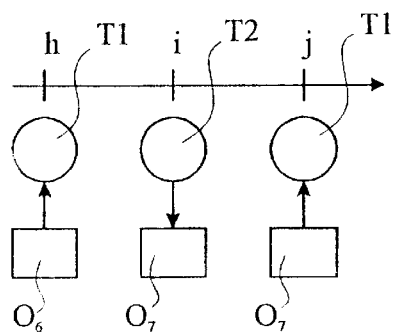
FIG. 3 illustrates schematically a third known problem concerning concurrent transactions in a database.

FIG. 3 illustrates a third case referred to here as an unrepeatable read, implying that a first transaction T1 reads an object O two times, a first time $O_6$ at time point "h" prior to the object $O_7$ having been updated by a second transaction T2 at time point "I", whereafter the first transaction T1 reads the object $O_7$, and a second time at time point "j". The two different readings effected through the first transaction T1 will then result in two different values $O_6$, $O_7$ and the result from the first reading cannot be re-obtained, since the first reading is unrepeatable.

This sequence of actions consists in "read, write, read", which can create a conflict as shown.

Because the transaction is a non-changing transaction, the problem can be prevented by setting on the first reading a shared lock that prevents the changing transaction T2 from obtaining an exclusive lock, and consequently from updating the object.

The earlier described cases are described in more detail in publication "Transaction Processing: Concepts and Techniques", by Jim Gray and Andreas Reuter, Morgan Kauftmann Publishers, Inc., 1993. ISBN 1-55860-190-2.

The problem mainly addressed by the present invention is similar to the unrepeatable read problem described in the third case, but with the difference that different objects are read.

Figure 4:
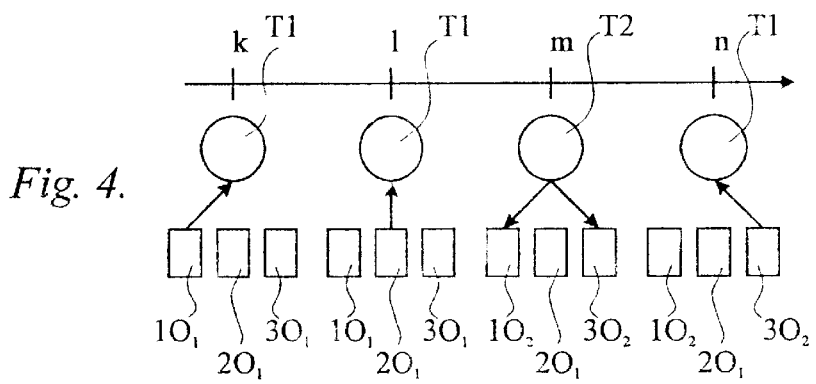
FIG. 4 illustrates schematically a fourth problem concerning concurrent transactions and mutually dependent objects in a database.

We call this problem a non-blocking read problem, which is described below with reference to FIG. 4. FIG. 4 shows that a first transaction has requested access to a number of different objects, for instance to objects 1O, 2O and 3O. Two of the objects, object 1O and object 3O, have mutual dependency.

A first transaction T1 reads the object $1O_1$ at a first time point "k", reads the object $2O_1$ at a second time point "I", and reads the object $3O_2$ at a third time point "n".

The two objects $1O_2$ and $3O_2$ are updated by a second transaction T2 at a time point "m" which is prior to the third time point "n" but subsequent to the first time point "k".

Thus, the first transaction T1 sees a first version $1O_1$ of the object 1O and a second version $3O_2$ of the object 3O, these versions being mutually inconsistent in relation to the dependency between the two objects 1O, 3O.

This problem can also be solved by traditional locking in two phases, whereby either the first transaction T1 blocks the second transaction T2 with a shared lock on tile objects 1O, 2O and 3O, or by the second transaction T2 blocking the first transaction T1 with an exclusive lock set on the objects 1O and 3O.

The waiting transaction is blocked by the transaction owning the lock, in both cases. The object of the present invention is to reduce the detrimental effect of this blocking while still allowing the first transaction to obtain a consistent-picture of the three objects 1O, 2O and 3O.

The invention relates to a method in which the transactions carried out in the database are managed by locking in two phases, of which a first phase includes a request for access to an object affected by a transaction and locking of the objects after access thereto has been obtained, and of which a second phase includes transaction commitment and the release of all locks set in the first phase.

The actual work carried out by a transaction may include actions or events that change a data object and/or actions or events that do not change said object.

Figure 5:
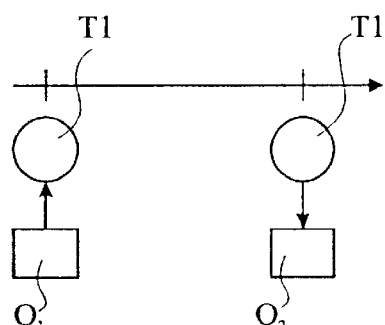
FIG. 5 illustrates schematically one condition for updating an object in a database in accordance with the present invention.

The present invention also includes changing, or updating, the content of an object by a transaction T1 reading the content of an object $O_1$ and writing the changed content to provide a new version of the object $O_2$ (in accordance with FIG. 5), wherein the version of the object $O_1$ that existed prior to said transaction being retained until no further transactions longer use this existing version $O_1$.

With a starting point from these assumptions, the present invention proposes that a transaction is adapted to retain access to affected objects after the second phase. The transaction shall also be adapted to carry out all data changing actions in the first phase, and to carry out the largest possible number of non-changing actions in a third phase, after the second phase.

A transaction can include various actions. These actions include:

- Opening and locking an object. This implies adding an object to the set of objects opened by a transaction.

. Navigating. This implies reading part of the contents of an open object to determine the identity of the keys to or the references to some other object. Accessing/navigation to the next object is no problem if the object has already been opened.

. Reading a value belonging to the content of an opened object.

- Writing a value into an object, for instance updating an object.

- Creating a new object. This will add the new object to the set of objects opened by a transaction.

- Deletion of an existing object. This will add the deleted object to the set of objects opened by the transaction.

. Other computation that is not directly concerned with access to objects opened by the transaction.

Actions that are marked with a hyphen, "-", are actions that are data-changing in some respect and that must be performed in the transaction in the first phase, i.e. before commit. Actions that have been marked with a bullet, ".", are actions that are not data-changing and that in principle can be performed after the second phase, i.e. after commit.

According to the present invention, a transaction closes access to an object alter carrying out still unperformed non-changing actions.

Figure 6:
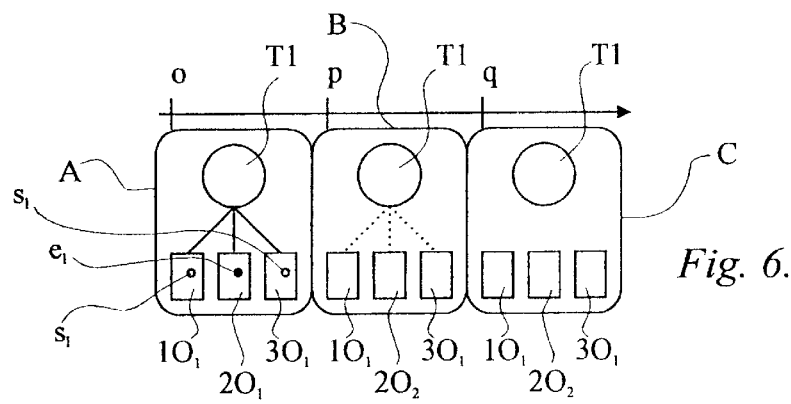
FIG. 6 illustrates schematically the division of a transaction into different phases in accordance with the invention.

FIG. 6 is a simplified illustration of the appearance of a data-changing transaction T1 in accordance with the invention. The first phase "A" is commenced at time point "o". The transaction T1 is afforded access to the objects 1O, 2O, 3O affected by the transaction T1 in this phase, which is shown in the Figure by full lines between the objects and the transaction. Pertinent locks are set on respective objects, shown in the Figure schematically with dots within locked objects, where a solid dot shows an exclusive lock e1 and a hollow dot shows a shared lock s1.

In the illustrated case, the lock on the second object 2O is an exclusive lock e1, since the transaction T1 is a changing transaction with respect to this object. The locks on the remaining objects are shared locks s1, since the transaction T1 is a non-changing transaction with respect to these objects.

All changing actions are carried out by the transaction T1 in the first phase "A". Such a change consists in the updating of the second object 2O from a first version $2O_1$ to a second version $2O_2$.

The second phase "B" is commenced at time point "p". This phase includes releasing set locks and a commitment by the transaction T1.

However, the availability of a concerned object is retained even after the second phase, in accordance with the inventive concept. This availability means that the objects are still open for transaction T1, as shown with dotted lines in the Figure.

Upon completion of the second phase "B", a third phase "C" is commenced at time point "q", wherein remaining non-changing actions are carried out by the transaction T1. Examples of such actions are those previously marked with a bullet.

The third phase "C" also includes releasing the availability of the objects 10, 20, 30 to the transaction T1 here referred to as object closing, which is the last action carried out in the third phase "C", i.e. after remaining non-changing actions have been carried out.

A transaction T1 is therewith provided a retained consistent snapshot of concerned objects in the database for the non-changing actions after releasing all locks, i.e. in the second phase "C" in FIG. 6.

This access is unlimited with regard to time, since the action is totally non-blocking in relation to other transactions. A limiting factor, however, can be the memory capacity or access, since this access requires the ability of the current version of the objects to be kept in the memory.

In order to ensure that a version of an object that is not locked by a transaction but that is still open for a transaction in accordance with the aforesaid will not be erased, it is proposed in accordance with the invention that access to an object in the third phase "C" for a transaction is provided by marking current versions of respective objects as being used by the transaction, whereas closing consists of removing said marking.

Many different methods of marking an object used by a transaction are known to the art. The present invention is not restricted specifically to any of these methods, and can be adapted to respective methods. Embodiments of the present invention that are adapted to the two most common methods of marking an object used by a transaction are described below.

However, a common feature of these various methods, and a prerequisite of the present invention, is that an object is updated by storing the new version of the object in a different place in the database, and by saving the old version for as long as said version is marked as being used by a transaction.

In a first proposed embodiment of the invention, each version of an object is allocated a counter which is incremented or stepped-up when a transaction is afforded access to this version, such as when setting a lock, and decremented, or stepped down, when a transaction no longer needs access to said object, such as when releasing a lock.

In the case of such transaction management, it is proposed in accordance with the invention that this marking consists in that the counter is not decremented until the marking has been removed, at the end of the third phase "C" in FIG. 6, and not in conjunction with the lock being released, at the end of the second phase "B" in FIG. 6.

In this case, the current version of the object is erased in conjunction with the counter being decreased to zero, provided that the current version does not consist of the latest version of the object.

This means that the transaction is committed in conjunction with releasing the lock, which is effected as soon as all changing actions have been carried out by the transaction, but that the counter is not decremented in accordance with known techniques and that decrementation of the counter does not take place until the transaction no longer requires access to the object version, which occurs when remaining non-changing actions have been carried out by the transaction and/or when the transaction no longer needs access to the objects.

According to another proposed embodiment of the present invention, each transaction is allocated a time stamp showing the time at which the transaction was commenced, where each transaction stamps respective versions of concerned objects with its respective time stamp when no current object version is stamped with a time stamp from a younger transaction, and where each version of an object shall remain for as long as any transaction has not yet been terminated that is older than or equally as old as the youngest time stamp allocated to the current version.

In the case of such transaction management, it is proposed in accordance with the present invention that the mark will consist of the time stamp on the current version of respective objects and that the transaction is considered to be terminated when access to the object is closed.

This means that the transaction is committed in conjunction with releasing the lock at the end of the second phase "B" in FIG. 6, which is done as soon as all changing actions have been carried out by the transaction but that the transaction is considered to remain alive after commit, i.e. the time stamp is still valid, meaning that the current version cannot be erased since the transaction with its time stamp is still valid. The time stamp of the transaction is not removed until the transaction no longer requires access to the objects, which occurs when all non-changing actions have been carried out by the transaction and/or when the transaction no longer requires access to the objects, i.e. at the end of the third phase "C" in FIG. 6.

The effect of an inventive method will differ in magnitude in relation to the type of transaction concerned. There will now be described a number of different transactions with which the invention is considered to have particular aptitude.

A first example of such a transaction is one which includes solely non-changing actions and where the lock used is a shared lock, for instance a purely reading transaction.

This transaction enables other transactions to be given access to concerned objects prior to releasing the shared lock, although with the limitation that said transactions can only read the objects.

Figure 7:
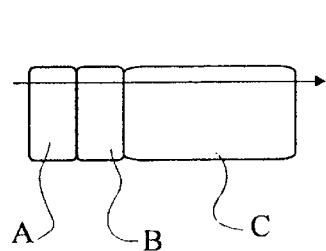
FIG. 7 is a schematic and highly simplified reading transaction in accordance with the present invention.

As shown in FIG. 7, since the time period "A", "B" over which the objects are locked consists solely in the time taken to provide access to all concerned objects and to lock these objects "A", and thereafter commit the transaction and release the lock "B", the time period will be relatively short. Since no changing actions shall be carried out, the transaction is committed immediately after all locks are set, the locks are released and the marking remains on current versions of respective objects, indicating that this version may not be erased.

Current objects are thus available for other non-changing transactions during the whole of this period, since the locks set are only shared locks, and are available for changing transaction directly after commit.

The time period up to the point at which concerned objects are closed "C" will vary with respect to the non-changing actions to be carried out.

Figure 8:
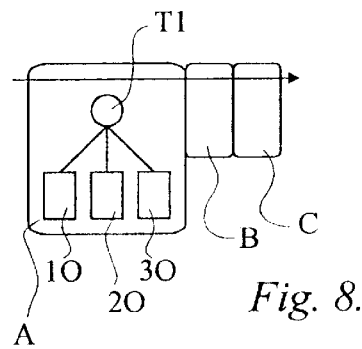
FIG. 8 is a schematic and highly simplified illustration of a group opening action in accordance with the present invention.

FIG. 8 is intended to illustrate the second example of a particularly beneficial transaction T1 with regard to the present invention. This is a transaction in which all objects 10, 20, 30 to be opened are known prior to commencing the transaction, this transaction being designated a group opening transaction. This transaction may, of course, include both changing and non-changing actions.

Regardless of whether or not the transaction includes both changing and non-changing actions or solely non-changing actions, concerned objects will be opened in the first phase "A".

Figure 9:
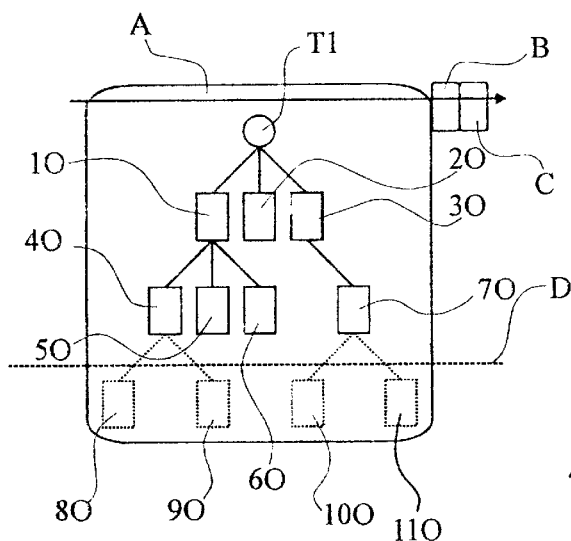
FIG. 9 is a schematic and highly simplified illustration of a recursive opening action in accordance with the present invention.

FIG. 9 is intended to illustrate the third example of a transaction T1 particularly advantageous with respect to the present invention. This is a transaction in which one or more start objects 10, 20, 30 are known prior to commencing the transaction and in which one or more of the start objects refers to one or more further objects 40, 50, 60, 70 concerned by the transaction, a so-called recursive opening transaction.

Regardless of whether this transaction includes both changing and non-changing actions or solely non-changing actions, the start objects 10, 20, 30 shall be opened in the first phase "A", and evaluation of any references to further objects, i.e. navigation within the start objects 10, 20, 30, shall be carried in the first phase "A", and any further objects 40, 50, 60, 70 shall be opened in the first phase "A".

In certain cases, any references from the further objects 40, 50, 60, 70 to still further objects 80, 90, 100, 110, will be evaluated in the first phase "A" and any still further objects 80, 90, 100, 110 shall be opened in the first phase "A" and so on with respect to possible further references.

It is proposed that a non-changing action, a navigation action, shall be carried out in the first phase "A", which is necessary in order to enable affected objects to be found and locked in the first phase "A".

With the intention of limiting the time period required to find all objects and to limit the number of objects opened by a transaction, it is possible in accordance with the invention to allow the number of permitted levels of objects deriving from references to further objects from earlier opened objects to be predetermined and limited "D". In FIG. 9, the number of permitted levels is restricted "D" to two, and hence objects 80, 90, 100, 110 are not opened.

Figure 10:
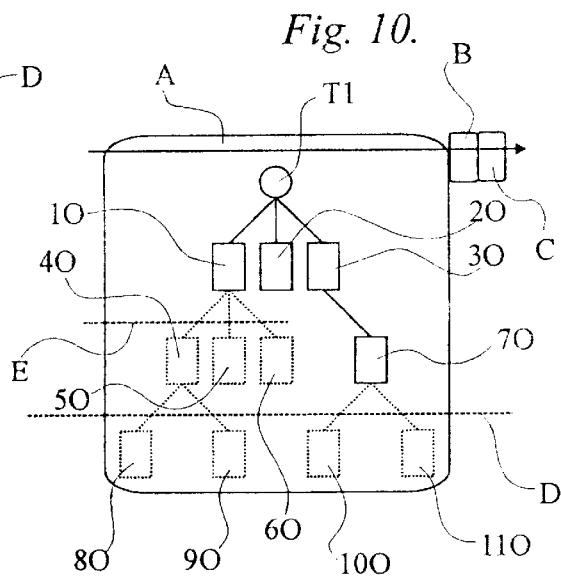
FIG. 10 is a schematic and highly simplified illustration of a path-opening action in accordance with the present invention.

FIG. 10 is intended to illustrated the fourth example of a transaction T1 that is particularly advantageous with respect to the present invention. This is a transaction in which one or more start objects 10, 20, 30 is/are known prior to commencing the transaction, and in which one or more current start objects refer to one or more further objects 40, 50, 60, 70, and in which any references to further objects are evaluated for one predetermined start object 30, of current start objects 10, 20, 30, designated here as a path-opening transaction.

Only the path, or branch, that arrives from the object 30 shall be evaluated, and is selected by the limitation "E" in FIG. 10.

Regardless of whether this transaction includes both changing and non-changing actions or solely non-changing actions, current start objects shall be opened in the first phase "A", navigation of the predetermined start object 30 shall take place in the first phase "A", and any further objects 70 shall be opened in the first phase "A".

Furthermore, any evaluation of possible references from the further objects 70 to still further objects 100, 110 shall be carried out in the first phase "A", possible still further objects 100, 110 shall be opened in the first phase "A", and so on with regard to possible further references.

It is also possible in this case to limit the time required to find all objects, and also to limit the number of objects opened by a transaction, by allowing the number of permitted levels of objects deriving from references to further objects from earlier open objects to be predetermined and restricted "D".

The intention of FIGS. 8, 9 and 10 is to show the opening procedure of affected objects in the first phase "A", and it will be understood that the relative size relationship between the various phases "A", "B", "C" shown in these Figures does not have any significance to the present invention.

The following procedure is followed by proposed transactions in all cases:

creation of a transaction;

opening of a number of objects in the absence of intermediate and time-consuming computations;

aborting the transaction and possibly making a later attempt, when access to one or more objects is blocked due to other transactions;

carrying out all changing actions and any necessary non-changing actions when access is afforded to all concerned objects;

committing the transaction and releasing all locks while retaining non-changing access to concerned objects providing the transaction with a consistent snapshot of concerned objects without risk of disturbing other transactions or being disturbed by said other transactions;

carrying out remaining non-changing actions; and releasing access to concerned objects.

Transaction management according to the present invention is not entirely non-blocking, since certain locks occur during the first phase "A" and the second phase "B", although simplicity with respect to implementation and execution in relation to fully non-locking systems makes this compromise acceptable and well adapted for certain applications.

It will be understood that what is meant by limitation of the locking in two phases is that it also involves transaction management with setting of locks and releasing of locks that includes more than two phases, although where one phase includes a request for access to an object affected by a transaction and locking of the object after access thereto has been obtained, and where another phase includes committing the transaction, and releasing all locks set in the first phase, regardless of any further phases that may be included in the transaction management.

It will be understood that the invention is not restricted to the aforedescribed and illustrated exemplifying embodiments thereof, and that modifications can be made within the scope of the inventive concept as evident from the following Claims.

What is claimed is:

1. A method of providing consistent reading of a number of objects within a database, wherein a database transactions is managed by locking in two phases, wherein a first phase includes a request for access to objects affected by said transaction and locking of said objects after access thereto has been obtained, wherein a second phase includes committing said transaction, and wherein all locks set in said first phase are released, wherein an actual work carried out by said transaction can include object-changing actions and/or object non-changing actions, wherein a change in the content of an object, or updating of said object, is effected by said transaction writing a new content into a new version of said object, wherein the current version of said object prior to said transaction is retained until no further transactions make use of said current version, and wherein said transaction performs all changing actions in said first phase, characterised in that said transaction retains said access for reading concerned object versions after said second phase, said access to an object after said second phase consists in marking the current versions of respective object as being used by said transaction, in that said transaction carries out the largest possible number of non-changing actions after said second phase; and in that said transaction closes the access to said objects after performing said non-changing actions, where closing of a transaction consists in erasing said mark, whereby said method provides a consistent snapshot of affected objects within said database after the release of said locks.

2. A method according to claim 1, in which each version of an object is allocated a counter which is incremented when a transaction is afforded access to said version, such as when setting a lock, and is decremented when a transaction no longer requires access to said object version, such as when releasing a lock, characterised in that said mark consists in an incrementation of said counter, and that erasing said mark is done by a decrementation of said counter.

3. A method according to claim 2, characterised in that said transaction includes solely non-changing actions; and in that said lock consists of a shared lock, meaning that other transactions can be afforded access to said objects prior to said lock being released, although with the limitation of being able to only read said objects.

4. A method according to claim 2, characterised in that all objects to be opened are known prior to commencement of said transaction, and that said objects are opened in said first phase.

5. A method according to claim 2, characterised in that one or more start objects is/are known prior to commencement of said transaction, wherein one or more of said start objects refers/refer to one or more further objects; in that said start object(s) is/are opened in said first phase; in that any references to further objects are evaluated in said first phase; in that said further objects are opened in said first phase; in that any references deriving from said further objects to still further objects are evaluated in said first phase; and in that said still further objects are opened in said first phase, and so on.

6. A method according to claim 2, characterised in that one or more start objects is/are known prior to commencing said transaction, wherein one or more of said start objects refers/refer to one or more further objects; in that said start object(s) is/are opened in said first phase; in that any references to further objects are evaluated with respect to one predetermined start object of said start objects in said first phase; in that said further objects are opened in said first phase; in that any references from said first objects to still further objects are evaluated in said first phase; and in that said still further objects are opened in said first phase, and so on.

7. A method according to claim 1, in which each transaction is allocated a time stamp that shows the time at which said transaction was commenced, wherein each transaction stamps a respective version of affected objects with its time stamp when the object version concerned has not been time-stamped by a younger transaction, and in which each version of an object is allowed to remain for as long as any transaction has not yet been terminated that is older than or equally as old as the youngest time stamp allocated to said version, characterised in that said mark consists in said time stamp on said version of respective objects; and in that said transaction is considered to be terminated when access to said object is closed.

8. A method according to claim 7, characterised in that said transaction includes solely non-changing actions; and in that said lock consists of a shared lock, meaning that other transactions can be afforded access to said objects prior to said lock being released, although with the limitation of being able to only read said objects.

9. A method according to claim 7, characterised in that all objects to be opened are known prior to commencement of said transaction, and that said objects are opened in said first phase.

10. A method according to claim 7, characterised in that one or more start objects is/are known prior to commencement of said transaction, wherein one or more of said start objects refers/refer to one or more further objects; in that said start object(s) is/are opened in said first phase; in that any references to further objects are evaluated in said first phase; in that said further objects are opened in said first phase; in that any references deriving from said further objects to still further objects are evaluated in said first phase; and in that said still further objects are opened in said first phase, and so on.

11. A method according to claim 7, characterised in that one or more start objects is/are known prior to commencing said transaction, wherein one or more of said start objects refers/refer to one or more further objects; in that said start object(s) is/are opened in said first phase; in that any references to further objects are evaluated with respect to one predetermined start object of said start objects in said first phase; in that said further objects are opened in said first phase; in that any references from said first objects to still further objects are evaluated in said first phase; and in that said still further objects are opened in said first phase, and so on.

12. A method according to claim 1, characterised in that said transaction includes solely non-changing actions; and in that said lock consists of a shared lock, meaning that other transactions can be afforded access to said objects prior to said lock being released, although with the limitation of being able to only read said objects.

13. A method according to claim 1 inclusive, characterised in that all objects to be opened are known prior to commencement of said transaction, and that said objects are opened in said first phase.

14. A method according to claim 1 inclusive, characterised in that one or more start objects is/are known prior to commencement of said transaction, wherein one or more of said start objects refers/refer to one or more further objects; in that said start object(s) is/are opened in said first phase; in that any references to further objects are evaluated in said first phase; in that said further objects are opened in said first phase; in that any references deriving from said further objects to still further objects are evaluated in said first phase; and in that said still further objects are opened in said first phase, and so on.

15. A method according to claim 14, characterised by predetermining the number of permitted levels of objects deriving from references to further objects from earlier opened objects.

16. A method according to claim 1 inclusive, characterised in that one or more start objects is/are known prior to commencing said transaction, wherein one or more of said start objects refers/refer to one or more further objects; in that said start object(s) is/are opened in said first phase; in that any references to further objects are evaluated with respect to one predetermined start object of said start objects in said first phase; in that said further objects are opened in said first phase; in that any references from said first objects to still further objects are evaluated in said first phase; and in that said still further objects are opened in said first phase, and so on.

17. A method according to claim 16, characterised by predetermining the number of permitted levels of objects that derive from references to further objects from earlier opened objects.

18. A method of providing consistent reading of a number of objects within a database comprising the steps of:

providing a transaction including object-changing actions and/or object non-changing actions, said object changing actions include changing content of an object and/or updating said object by said transaction writing a new content into a new version of said object;

performing a first phase of requesting access to objects affected by a transition, locking said objects after access thereto has been obtained, and performing all object changing actions by said transaction;

performing a second phase of committing said transaction and releasing all locks set in said first phase; and performing a third phase of retaining a current version of said object prior to said transaction until no further transactions make use of said current version, retaining access for reading concerned object versions, carrying out a largest possible number of non-changing actions by the transition, and closing access to said objects after performing said non-changing actions.

19. A method according to claim 18, wherein the step of retaining access for reading consists of marking current versions of respective object as being used by said transaction and wherein the step of closing the access consists of erasing the marking.

20. A method according to claim 19, further comprising the step of allocating each version of an object a counter which is incremented when a transaction is afforded access to said version, such as when setting a lock, and which is decremented when a transaction no longer requires access to said object version, such as when releasing a lock, and wherein said marking consists of an incrementation of said counter, and erasing said mark is done by a decrementation of said counter.

21. A method according to claim 19, further comprising the steps of allocating each transaction a time stamp that shows the time at which said transaction was commenced, wherein each transaction stamps a respective version of affected objects with its time stamp when the object version concerned has not been time-stamped by a younger transaction, and allowing each version of an object to remain for as long as any transaction has not yet been terminated that is older than or equally as old as the youngest time stamp allocated to said version, wherein said marking consists of said time stamp on said version of respective objects; and wherein said transaction is considered to be terminated when access to said object is closed.

* * * * *